United States Patent Office 3,358,611
Patented Dec. 19, 1967

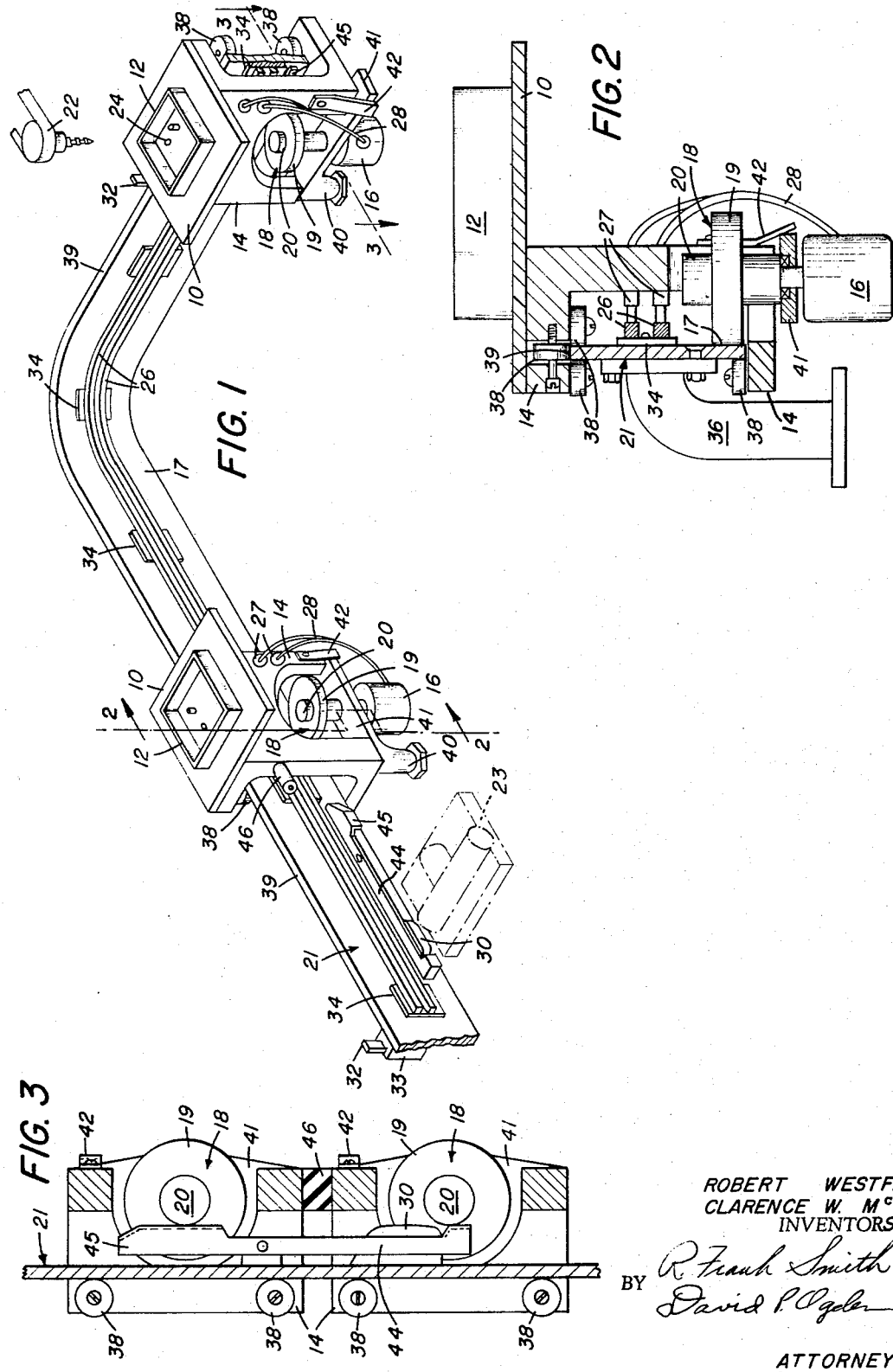
ROBERT WESTFALL
CLARENCE W. McVEA
INVENTORS

3,358,611
MONORAIL ASSEMBLY SYSTEM
Robert Westfall and Clarence W. McVea, Rochester, N.Y.,
assignors to Eastman Kodak Company, Rochester,
N.Y., a corporation of New Jersey
Filed Sept. 17, 1965, Ser. No. 492,979
7 Claims. (Cl. 104—120)

ABSTRACT OF THE DISCLOSURE

Ball bearing supported pallets are self propelled on an endless track from one assembly station to a next. At each station the pallet is stopped at a precise location so that precisely controlled operations may be accomplished.

*Background of the invention*

This is a continuation-in-part of patent application Ser. No. 324,293, filed Nov. 18, 1963, now abandoned. The present inventoin relates to a monorail assembly system and, more particularly, to a monorail assembly system suitable for transporting thereon a plurality of self-driven pallet assemblies which may be stopped at various sub-assembly stations along the monorail track.

In the art of automation or more particularly, automated or partially automated assembly lines, it is common parctice to convey both parts and assembly units to a sub-assembly station where these parts and units are coupled together to form a more complete assembly unit. Various types of conveyors have been utilized including chain-driven conveyors with or without automatic stops or detaching means which conveyors are often used to assure a continuous supply of necessary parts at a selected sub-assembly station. Belt conveyors are also used, as are chutes, etc. However, most conveyor systems of the types used with sub-assembly stations for production lines do not automatically position an assembly unit in a precisely predetermined location relative to automatic tools and equipment which may be utilized to operate upon the assembly unit. Even those that do accomplish precise location often accomplish it in a rather complex manner, usually by means of direct assembly unit manipulation at the sub-assembly station by use of complex jigs and fixtures requiring close supervision and inspection and frequent maintenance.

Therefore, an object of the present invention is to provide a simple and reliable monorail transport system arranged to automatically position sub-assembly components in a predetermined location.

A more specific object of the present invention is to provide a precise and reliable stopping arrangement for pallet assemblies conveyed on a monorail track.

In accordance with one embodiment of our invention, an endless monorail track supports a plurality of self-propelled pallet assemblies. The location of the track is fixed and each terminal location of the pallet assemblies on the track is predetermined by stop mechanisms precisely located relative to sub-assembly stations. The self-propelling of the pallet assemblies is accomplished by an electric motor carried on each pallet assembly, with this motor being of the type which may be continuously energized irrespective of whether or not it moves the pallet assembly. By this means a continuous torque is applied from the motor to the track to drive the pallet assembly in a forward direction. The wheel of the motor is provided with two different surface diameters whereby driving through the larger drive wheel portion accomplishes a relatively rapid transport of the pallet assembly between stations while driving through the smaller diameter portion of the drive wheel accomplishes a much slower transport of the pallet assembly just prior to each terminal location. At each sub-assembly station are provided means for converting from one drive portion of the drive wheel to the other to slow down the pallet assembly prior to its reaching the terminal point. Moreover, the stopping of a first pallet assembly at a sub-assembly station actuates means for slowing a second pallet assembly prior to its reaching the stationary one.

The subject matter which is regarded as our invention is particularly pointed out and distinctly claimed in the concluding portion of this specification. The invention, however, as to its organization and operation together with further objects and advantages thereof, will best be understood by reference to the following description taken in connection with the accompanying drawing in which:

FIG. 1 is a perspective view of a section of a monorail transport assembly system in accordance with our invention;

FIG. 2 is an elevational view partially in section taken along the line 2—2 of FIG. 1 and showing a pallet assembly on the monorail track; and FIG. 3 is a view showing the relationship between two pallet assemblies. The view of each assembly corresponds to a plan view taken substantially along line 3—3 in FIG. 1.

Referring now to the drawing, wherein like numbers refer to similar parts, we have shown in FIG. 1 a transport system supporting a pair of pallet assemblies each provided with a pallet platform 10 supporting an assembly unit or component 12 to be worked on. The pallet platform 10 is supported upon a frame member 14 which pivotally supports a driving motor 16. The motor 16 is provided with a drive wheel 18 having a large diameter drive surface 19 and a small diameter drive surface 20. As illustrated in FIG. 1 the large diameter drive surface 19 is engaging a drive surface 17 of an endless monorail track 21 which is threaded through a tortuous path past a plurality of sub-assembly stations, one sub-assembly station being indicated at 22 and a next sub-assembly station 23 (shown in phantom).

By way of example, the sub-assembly station 22 may be utilized to provide the assembly component 12 with a tapped hole 24 for receiving a threaded member (not illustrated) to be positioned, inserted, and secured therein at the station 23. The details of the arrangement of the sub-assembly station 23 are explained more fully in the co-pending patent application, Ser. No. 324,319, filed Nov. 18, 1963, now Patent No. 3,247,586, issued Apr. 26, 1966, to Robert Westfall and assigned to the assignee of the present case.

Referring again to FIG. 1, power for the motor 16 is provided continuously through bus bars 26, commutator brush assemblies 27, and a power line 28. We prefer that the bus bars 26 etc. be constantly energized with a relatively low voltage such as 24 volts enhancing minimum use of insulation and minimum danger of personnel injury.

In order that the assembly line may be easily enlarged or otherwise modified, we prefer to have the track 21 fabricated of two foot sections of ⅜" x 6" steel mounted vertically. The bus bars 26 are preferably secured to each section and joined to form endless bus bars by plug-in friction couplings.

As the pallet platforms 10 reach the sub-assembly stations (e.g. 23) the smaller drive surface 20 of the drive wheel 18 is engaged by an elevated track portion or ramp 30. With the smaller drive surface being solely effective to drive the pallet assembly, the pallet assembly is slowed to approximately one-third of its normal drive speed at the time a rugged slideable stop latch 32 driven by a solenoid 33 engages a surface of the frame 14 to completely stop the pallet assembly. As explained above, the continuous drive system maintains the pallet assembly tight against the stop latch 32.

The carbon brushes of the brush assemblies 27 are more clearly illustrated in FIG. 2 as is the support for the bus bars 26 which takes the form of laminated insulating pads 34. As is also shown more clearly in FIG. 2, the track 21 is supportable by means illustrated as a heavy-duty strut 36. Usually the struts 36 will be supported above the floor so that the pallet platform 10 and the sub-assembly stations are at a convenient working level such as thirty to forty inches above the floor.

Transport of each pallet assembly along the track 21 is facilitated by a plurality of ball bearing rollers 38 journalled on the frame 14. A portion of these rollers engage a top support surface 39 of the track. The use of precision ball bearings has the advantage that it is no longer necessary to lift the assembly component 12 from the pallet platform 10 to attain a precisely controlled elevation of the assembly component. Such a simplified arrangement for attaining a precise location of the assembly component 12 on the monorail track saves substantial cycle time at each sub-assembly station over prior art arrangements. Also, because of the two-speed driving arrangement, it is preferred that the support surface 39 be separate from the drive surface 17 whereby the precise location of the platform 10 is not disturbed by the drive arrangement or changes of driving force developed during stopping of the pallet assemblies.

In order that the driving motor 16 may drive the pallet platform 10 by means of either portion of the drive wheel 18, the motor 16 and the drive wheel 18 are resiliently mounted and pivotally supported on the pallet frame 14 by and arm 41 having a pivot bearing 40 (FIG. 1) and biased toward the drive surface 17 by a spring means shown as a leaf spring 42. Because of the ramp 30 and the resilient mounting, the larger surface 19 of the drive wheel 18 will not continuously engage the drive surface 17. Thus, we prefer that the drive wheel 18 does not form a rigid portion of the pallet support system. The precision locating portions of the pallet assembly include the monorail track 21 and the ball bearing rollers 38. Thus, the influence of the ramp 30 does not cause misalignment of the pallet assembly. As shown more clearly in FIG. 3, the ramp 30 is of sufficient thickness, such as 1 1/16 inch, to engage the smaller drive surface 20 and lift the larger drive surface 19 from the driving surface 17 of the monorail track 21 when the diameters of these drive surfaces are 3 inches and 1 inch respectively. Obviously, with only the smaller diameter surface engaging a solid driving surface of the ramp 30, the pallet assembly will advance at a much slower velocity. Also, at this slower velocity the driving force is substantial, whereby bounce-back is effectively eliminated.

As also illustrated in FIG. 3, a second pallet assembly has reached one of the sub-assembly stations (e.g. 23) where a lead pallet assembly already resides. The second pallet assembly has been slowed by a lever 44 which has a work surface driven by the lead pallet assembly to cause a ramp 45 thereof to swing outward to engage the small drive surface 20 of the trailing pallet drive wheel 18. The lever ratios of the lever 44 are selected so that the lead pallet spring 42, exerts more than enough force to deflect the pring 42 of the trailing pallet assembly.

Once the trailing pallet assembly has been slowed, its colliding with the stationary pallet assembly will usually not be sufficient to disturb any assembly operation which is in progress. However, to further limit this disturbance, we have provided a rubber bumper 46. The rubber bumper 46 is positioned, as shown more clearly in FIG. 1, close to horizontal alignment with the center of gravity of the whole pallet assembly. Although not as critical to the operation of our invention because no work is performed on the assembly componet 12 at the precise instant it is stopped, the stop latch 32 is similarly positioned near horizontal alignment with the center of gravity, and in front of an advancing pallet assembly.

While we have shown and described particular embodiments of the present invention, other modifications may occur to those skilled in this art. For instance, it is, of course, feasible to add additional levers 44 so that more than two pallet assemblies may be stopped at a single sub-assembly station. However, it is usually preferable to program the several sub-assembly stations so that most of the assembly pallets are being operated on simultaneously with relatively few excess pallet assemblies traveling therebetween. We intend, therefore, to have the appended claims cover all embodiments which fall within the true spirit and scope of our invention.

We claim:
1. An assembly system suitable for transporting a plurality of self-driven pallet assemblies, comprising:
   (a) a track provided with a drive surface thereon;
   (b) a plurality of pallet assemblies moveably supported on said track;
   (c) a driving motor supported on each of said pallet assemblies;
   (d) a drive wheel having a large diameter drive surface, arranged to normally engage the drive surface of said track, and a smaller diameter drive surface, with said drive wheel being driveable by said driving motor;
   (e) a first ramp secured to said track and having a surface at a location which will engage the small diameter drive surface during passage of said drive wheel thereby to disengage the large diameter drive surface from the track drive surface; and
   (f) a lever having a work surface closely adjacent to said first ramp to be engaged by a first of said pallet assemblies for actuating a second ramp surface behind the first ramp surface to engage a next pallet assembly by means of its small diameter drive surface.

2. An assembly system in accordance with claim 1 wherein each of said pallet assemblies is provided with a resilient bumper means located substantially along a a horizontal alignment with the center of gravity thereof and arranged to make exclusive contact between successive pallet assemblies.

3. An assembly system suitable for transporting a plurality of self-driven pallets, comprising:
   (a) a track provided with a support surface and a separate drive surface thereon;
   (b) a plurality of pallet assemblies moveably supported on the support surface;
   (c) a driving motor supported on each of said pallet assemblies;
   (d) electric circuit means in a predetermined relationship to said track for continuously energizing said motor;
   (e) a drive wheel, having a large diameter drive surface arranged to engage the drive surface of said track and a small diameter drive surface, with said drive wheel being driveable by said motor;
   (f) a first ramp sceured to said track and having a surface at a location which will engage the small diameter drive surface during passage thereby of said drive wheel of a first of said pallet assemblies and of a thickness sufficient to lift the large diameter drive surface from the track drive surface; and
   (g) a lever having a work surface closely adjacent to said first ramp to be engaged by said first pallet assembly for actuating a second ramp behind said first ramp with the second ramp having a surface positioned during such actuation to engage and to slow a second of said pallet assemblies, as it approaches said first pallet assembly.

4. An assembly system in accordance with claim 3 wherein said electric circuit means includes a pair of bus bars secured to said track and a pair of carbon brush assemblies secured to each of said pallet assemblies for coupling said motor to said bus bars continuously.

5. An assembly system suitable for transporting a plurality of self-driven pallet platforms, comprising:
(a) a track providing with a support surface and a separate drive surface thereon;
(b) a plurality of pallet assemblies moveably supported on said track and each supporting one of the pallet platforms;
(c) a continuously energizable motor supported on each of said pallet assemblies;
(d) a drive wheel, having a large diameter drive surface arranged to engage resiliently the drive surface of said track and a small diameter drive surface, with said drive wheel being continuously driveable by said motor;
(e) a first ramp secured to said track adjacent to the drive surface thereof to engage the small diameter drive surface during passage thereby of said drive wheel of a first of said pallet assemblies, and of an effective thickness sufficient to disengage the large diameter drive surface from the track drive surface;
(f) a lever having a work surface closely adjacent to the first ramp surface to be engaged by said drive wheel of a first of said pallet assemblies for actuating a second ramp surface behind said first ramp to engage said drive wheel of a second of said pallet assemblies and thus be effective to slow said second pallet assembly as it approaches said first pallet assembly; and
(g) a stop latch arranged to selectively stop and hold said first pallet assembly at a location such that the lever work surface is engaged by the small diameter drive surface of said drive wheel.

6. An assembly system in accordance with claim 5 wherein said stop latch is at a location substantially in front of the center of gravity of said pallet assemblies, and each of said pallet assemblies is provided with a resilient bumper means which is also substantially horizontally aligned with the center of gravity of each of said pallet assemblies for softening shock by contact between said first and said second pallet assemblies.

7. An assembly system suitable for transporting a plurality of self-driven pallet platforms, comprising:
(a) a track provided with a support surface and a separate drive surface thereon;
(b) a plurality of pallet assemblies moveably supported on said track and each supporting one of the pallet platforms;
(c) a plurality of precision ball bearing rollers arranged to engage at least two adjacent sides of said track to maintain each of said pallet assemblies in a precisely controlled attitude thereon;
(d) a continuously energizable motor supported by each of said pallet assemblies;
(e) a drive wheel, having a large diameter drive surface arranged to engage the drive surface of said track and a small diameter drive surface for engaging a raised surface secured to said track with said drive wheel being continuously driveable by said motor;
(f) a spring means urging each of said wheels toward said track so that at least one of the drive surfaces continuously exerts a drive force thereon;
(g) a ramp secured to said track and having a ramp surface thereon at a location which will engage the small diameter drive surface during passage thereby of said drive wheel and an effective thickness sufficient to disengage the large diameter drive surface from the track drive surface;
(h) a lever with a work surface closely adjacent to the ramp surface to be engaged by a first of said pallet assemblies for actuating another ramp surface behind said first pallet assembly to be effective to slow a second of said pallet assemblies as it approaches said first pallet assembly, the working ratios of said lever being such that the bias of said spring means of said first pallet assembly is sufficient to overcome the bias of said spring means of said second pallet assembly; and
(i) a stop latch arranged to selectively stop and hold said first pallet assembly at a location such that the lever work surface is engaged thereby.

References Cited

UNITED STATES PATENTS

| | | | |
|---|---|---|---|
| 2,162,688 | 6/1939 | Lawrence | 104—153 |
| 2,619,916 | 12/1952 | Rainier | 104—172 |
| 3,056,359 | 10/1962 | Fey | 104—95 |

ARTHUR L. LA POINT, *Primary Examiner.*

H. BELTRAN, *Assistant Examiner.*